United States Patent [19]
Josefsson

[11] Patent Number: 5,853,070
[45] Date of Patent: Dec. 29, 1998

[54] VIBRATION AND SOUND DAMPING SPACERS FOR VEHICLE BRAKES AND A METHOD OF MAKING A WEB FOR MANUFACTURING SUCH SPACERS

[75] Inventor: Percy Josefsson, Ljungbyholm, Sweden

[73] Assignee: Rubore Materials Sweden AB, Kalmar, Sweden

[21] Appl. No.: 467,869

[22] Filed: Jun. 6, 1995

Related U.S. Application Data

[63] Continuation of Ser. No. 244,839, filed as PCT/SE92/00891 Dec. 22, 1992, abandoned.

[30] Foreign Application Priority Data

Dec. 27, 1991 [SE] Sweden ................................. 9103843

[51] Int. Cl.⁶ ............................. F16D 65/78; F16D 35/38
[52] U.S. Cl. .................................. 188/73.37; 188/264 G
[58] Field of Search ............................. 188/73.35, 73.36, 188/73.37, 250 B, 250 C, 251 A, 264 G; 192/107 C, 107 R; 428/461, 463

[56] References Cited

U.S. PATENT DOCUMENTS

| | | | |
|---|---|---|---|
| 1,712,965 | 5/1929 | Maranville | 428/317.1 |
| 3,885,651 | 5/1975 | Odier | 188/73.37 |
| 4,022,302 | 5/1977 | Jaussen | 188/73.37 |
| 4,098,951 | 7/1978 | Wolff | 188/73.35 |
| 4,240,530 | 12/1980 | Tillenburg | 188/264 G |
| 4,603,760 | 8/1986 | Myers | 188/77.37 |
| 5,063,098 | 11/1991 | Niwa et al. | 428/76 |
| 5,099,962 | 3/1992 | Furusu et al. | 188/73.37 |
| 5,213,879 | 5/1993 | Niwa et al. | 428/462 |

FOREIGN PATENT DOCUMENTS

| | | | |
|---|---|---|---|
| 614552 | 2/1961 | Canada | 188/73.37 |
| 2713377 | 9/1977 | Germany | 188/73.37 |
| 0308232 | 12/1988 | Japan | 188/264 G |
| 1550616 | 8/1979 | United Kingdom . | |
| 91/00966 | 1/1991 | WIPO . | |
| 90/13758 | 9/1991 | WIPO . | |

*Primary Examiner*—Robert Oberleiner
*Assistant Examiner*—Chris Schwartz
*Attorney, Agent, or Firm*—Burns, Doane, Swecker & Mathis, L.L.P.

[57] ABSTRACT

A vehicle brake vibration-and-noise damping insert is comprised of two thin plates and an intermediate damping layer. The damping layer is vulcanized to the two metal plates. A method of producing a material web for the manufacture of this type of insert is also provided. A first sheet-metal strip is coated on one side thereof with a rubber layer, while one side of a second sheet-metal strip is coated with an adhesive. The two metal strips are passed through a band vulcanizing machine with the coated sides of the strips facing one another, so as to vulcanize the rubber layer to the two metal strips.

3 Claims, 2 Drawing Sheets

5,853,070

VIBRATION AND SOUND DAMPING SPACERS FOR VEHICLE BRAKES AND A METHOD OF MAKING A WEB FOR MANUFACTURING SUCH SPACERS

This application is a continuation of application Ser. No. 08/244,839, filed as PCT/SE92/00891 Dec. 22, 1992, abandoned.

The present invention relates to a vibration-and-noise damping insert for vehicle brakes, and a method of producing a web for the manufacture of such inserts.

When operating the disc brakes of automotive vehicles, the friction pads are pressed against a rotating brake disc by means of a hydraulic piston-cylinder device. Many present-day disc brake systems utilize vibration-and-sound damping inserts or shims which are fitted to the friction pads, between said pads and their respective piston-cylinder devices. The inserts are normally comprised of thin metal plates or strips of non-woven material, which are coated on both sides with a rubber layer. These inserts prevent the brakes from squealing or squeaking.

In the case of vehicle disc brakes of this kind, and in particular in the case of the disc brakes of heavy vehicles, the piston rod of the hydraulic piston-cylinder unit tends to "eat" into the rubber layer facing said rod and create therein depressions which have the effect of reducing considerably the vibration-and-sound damping effect of the inserts. This problem has earlier been solved with the aid of an insert comprised of two thin steel plates which are bonded together by a layer of adhesive. A serious drawback with this solution, however, is that the adhesive layer is destroyed when the insert is subjected to high pressure and high temperature, causing the steel strips to separate from one another.

Accordingly, one object of the present invention is to provide a vehicle brake insert which will solve this problem without being destroyed at high pressure and high temperature and which will also provide effective vibration-and-sound damping.

This object is achieved in accordance with the invention with a vehicle brake insert which is characterized by two metal plates and a damping layer enclosed there between, said damping layer being thinner than each of said metal plates and comprised of a rubber layer which has been vulcanized to the two metal plates.

The rubber layer is preferably comprised of nitrile rubber.

The two plates preferably have essentially the same thickness and the thickness of the rubber layer is about one-third of the thickness of each plate.

Another object of the present invention is to provide a simple and effective method of producing a web of material from which the inventive insert can be manufactured.

This object is achieved in accordance with the inventive method, which is characterized by applying a layer of rubber onto one side of a first strip of sheet-metal, and by applying a coating of adhesive on one side of a second strip of sheet-metal, and by passing the two metal strips through a vulcanizing machine with the coated sides of said strips in mutual abutment, so as to vulcanize the rubber layer and the two metal plates together.

The invention will now be described in more detail with reference to the accompanying drawings.

Figure 1:
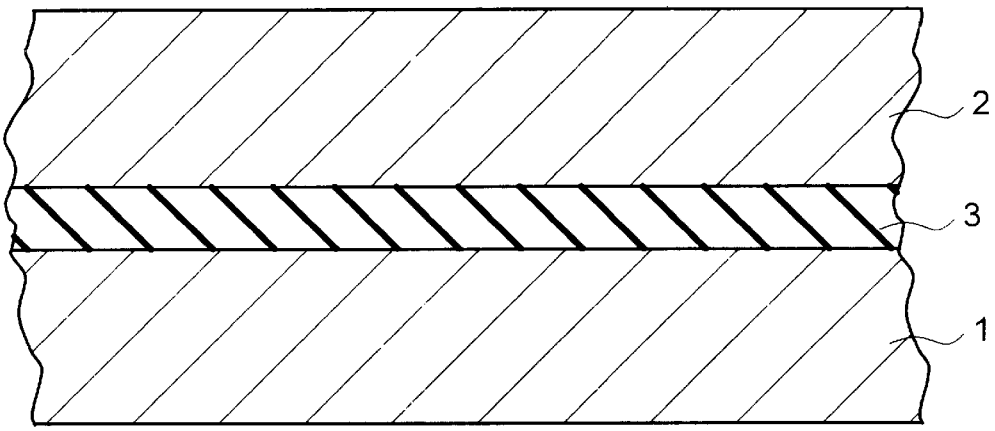
FIG. 1 is a sectional view of an inventive insert.

The insert illustrated in FIG. 1 is comprised of two thin steel plates 1 and 2 and a damping layer 3 which is sandwiched between the plates. Each of the plates 1 and 2 has a thickness of about 0.4 mm and the damping layer has a thickness of about 0.14 mm. The damping layer 3 is conveniently comprised of a nitrile rubber layer which is vulcanized to the two plates 1 and 2. Although not shown, the outer surface of the metal plate 1 is provided with a rust-preventing coating. The outer surface of the other plate 2 is coated with an adhesive (not shown) which enables the insert to be fitted to a respective friction pad of the vehicle brakes. The plate 1 is intended to coact with the piston rod of a hydraulic piston-cylinder device, which acts to manoeuver the brake shoe. It will be understood that the piston rod is liable to "eat" into the insert, as described in the aforegoing.

Figure 2:
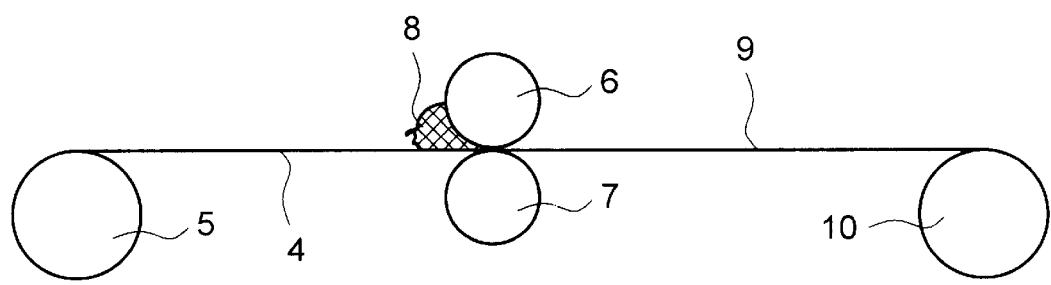
FIGS. 2, 3 and 4 are schematic illustrations of the inventive method.

The aforedescribed insert is manufactured with the aid of a carrier 4 (FIG. 2), which has the form of a continuous web wound onto a reel 5. The carrier 4 is comprised of a smooth fabric, for instance a so-called holland fabric, which is able to withstand temperatures of at least about 200° C.

One side of the carrier 4 is coated with rubber in a calendaring unit which comprises two calendaring rollers 6 and 7 to which a rubber compound 8, preferably nitrile rubber, is delivered on the entry side thereof and from which a rubber sheet 9 exits on the exit side thereof. The carrier 4 is taken from the reel 5 and is passed through the nip of the calendaring rollers 6 and 7, where the rubber sheet 9 is applied to the upper surface of the carrier. The carrier 4 and the rubber sheet 9 adhering thereto is then wound onto a further reel 10.

Figure 3:
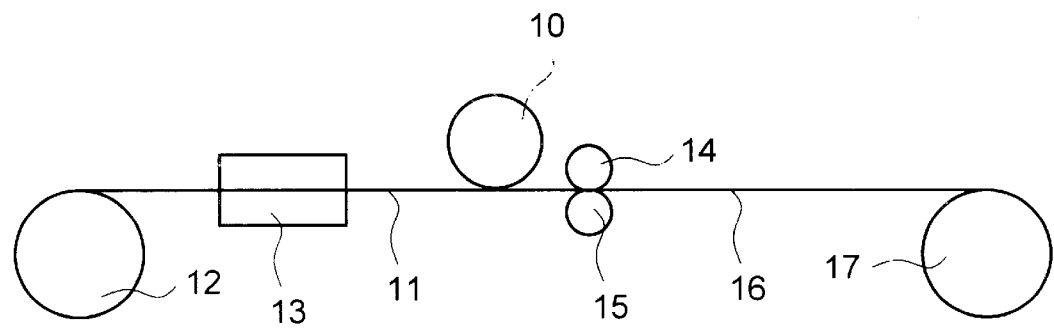

A strip 11 of sheet metal (FIG. 3) having an adhesive coating, for instance a phenolic resin based adhesive, is taken from a reel 12 and passed through a heating device 13, in which the strip is heated to a temperature of 50°–100° C. The metal strip 11 is then passed through the nip of two mutually coacting rolls 14 and 15. The rubber sheet 9 and its carrier 4 are unwound from the reel 10 and passed through the roll nip with the rubber sheet 9 facing towards the metal strip 11, so as to apply the rubber layer 9 to the metal strip 11. The resultant web structure 16 consisting of the metal strip 11, the rubber layer 9 and its carrier 4 is then wound onto a reel 17.

Figure 4:
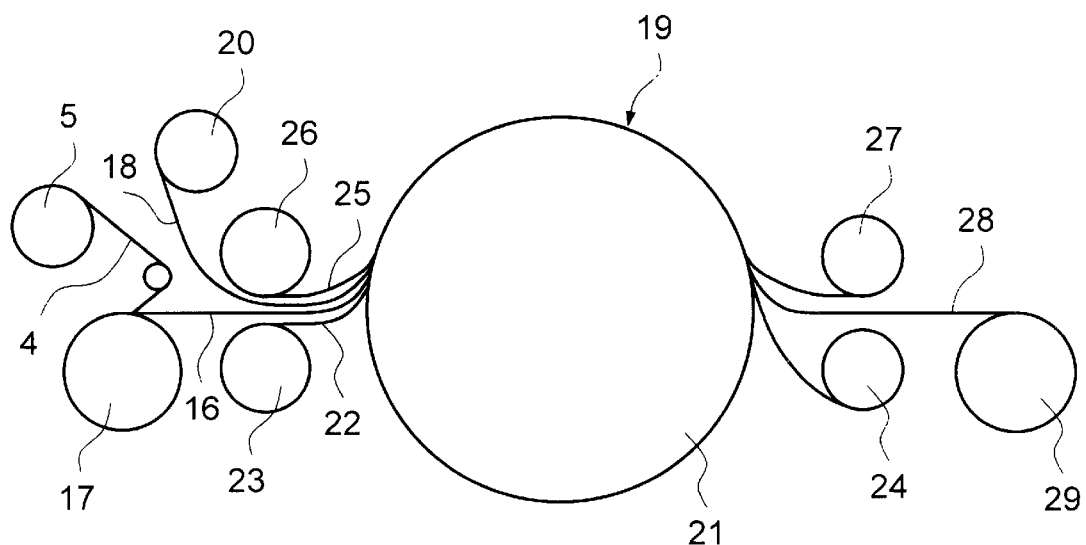

The thus produced web structure 16 is applied to one side of a metal strip 18 in a band vulcanizing machine 19 (FIG. 4). This side of the metal strip 18 has been coated with an adhesive, for instance a phenolic resin based adhesive. The web structure 16 is unwound from the reel 17 and the carrier 4 stripped from the web structure and wound onto a reel 5, while, at the same time, the metal strip 18 is unwound from a reel 20 and passed together with the thus stripped web structure 16 over the drum 21 of the band vulcanizing machine 19, this drum preferably being heated to a temperature of 170°–180° C. The web structure 16 and the metal strip 18 are subjected to a light pressure on the drum 21. As the web structure 16 and the metal strip 18 pass over the drum 21, they are accompanied by a bottom escort web 22 which is taken from a reel 23 upstream of the drum 21 and wound onto a reel 24 downstream of the drum, and also by an upper escort web 25 which is unwound from a reel 26 upstream of the drum 21 and wound onto a reel 27 downstream of the drum.

The rubber layer 9 is vulcanized to the two metal plates 11 and 18 in this way. The resultant web structure 28 formed by the web structure 16 and the metal strip 18 is wound onto a reel 29. Inventive inserts are then cut, for instance punched, from the web structure 28.

What is claimed is:

1. A method of producing a material web for the manufacture of vehicle brake vibration-and-sound damping inserts comprising two metal strips and a damping layer enclosed there between, wherein said damping layer is thinner than each of said metal strips and is comprised of a rubber layer which has been vulcanized to the two metal strips, said method comprising providing a rubber sheet on a carrier, applying said rubber sheet and said carrier to one side of a first metal strip, coating one side of a second metal strip with a vulcanizable adhesive, stripping off the carrier from the rubber sheet on the first metal strip, and passing said first metal strip with its applied rubber sheet facing the adhesive coated side of said second metal strip through a band vulcanizing machine so as to vulcanize the rubber sheet to the two metal strips.

2. The method according to claim 1, wherein the rubber layer is comprised of nitrile rubber.

3. The method according to claim 1, wherein the two metal strips have essentially the same thickness; and further wherein the thickness of the rubber layer is about one-third of the thickness of each metal strip.

* * * * *